Nov. 3, 1964     F. J. BOYER ETAL     3,155,165
TURBOPROP ENGINE CONTROL WITH UNDERSPEED GOVERNOR
Original Filed April 4, 1952
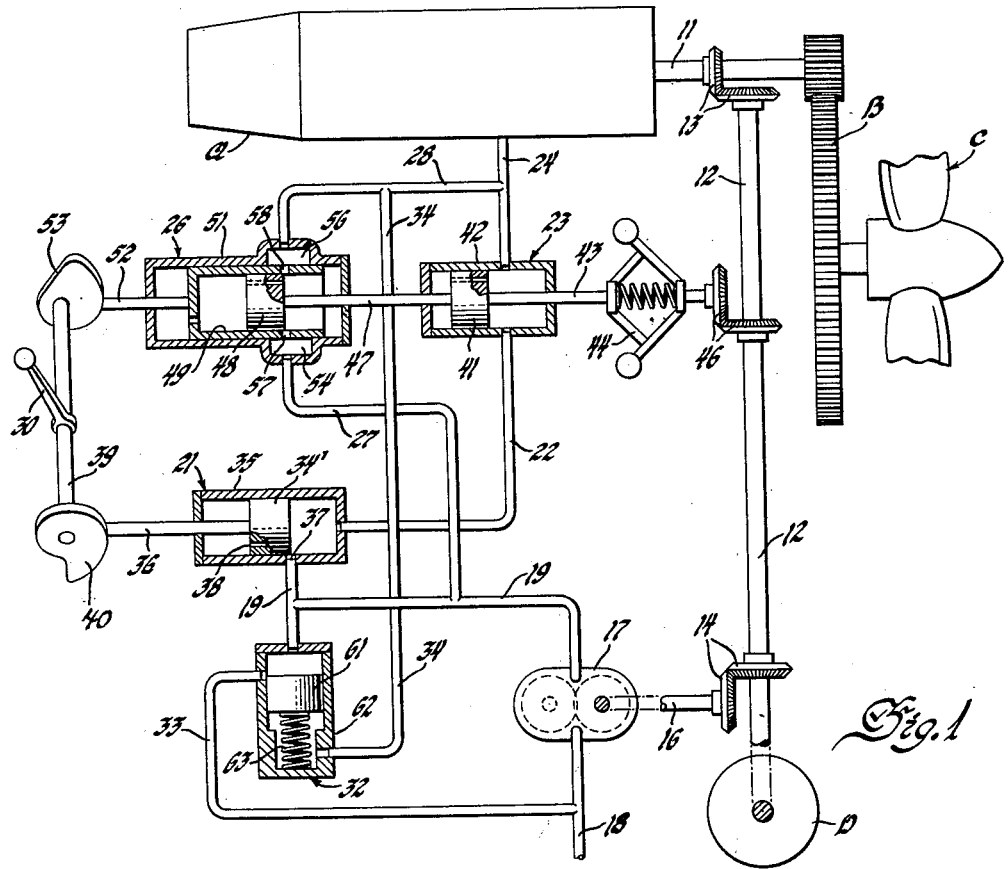
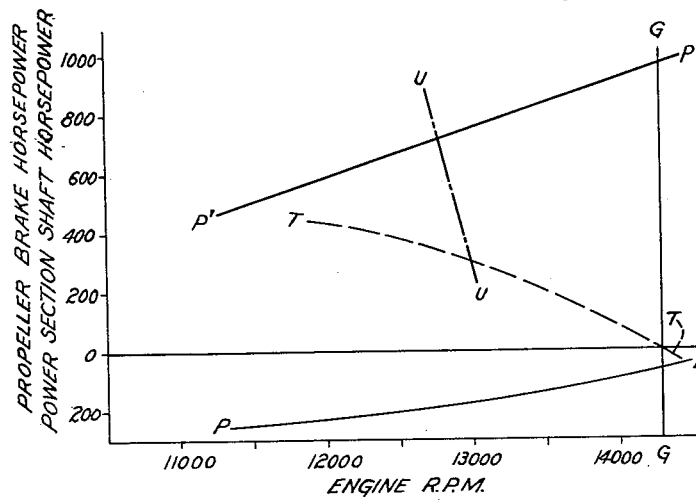
Fig. 2
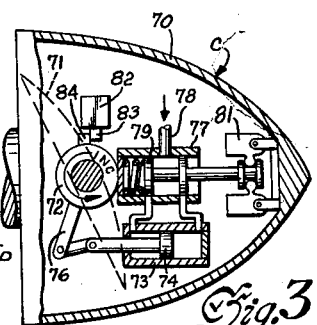
Fig. 3
Inventors
Robert J. Wente &
Floyd J. Boyer
By
Willits, Helmig & Baillio
Attorneys United States Patent Office 3,155,165
Patented Nov. 3, 1964

3,155,165
TURBOPROP ENGINE CONTROL WITH
UNDERSPEED GOVERNOR
Floyd J. Boyer and Robert J. Wente, Indianapolis, Ind., assignors to General Motors Corporation, Detroit, Mich., a corporation of Delaware
Continuation of application Ser. No. 280,466, Apr. 4, 1952. This application June 11, 1957, Ser. No. 665,627
15 Claims. (Cl. 170—135.74)

This application is a continuation of our application Serial No. 280,466, filed April 4, 1952.

Our invention relates to engine control and, more particularly, to control of fuel supply to engines, especially those of the gas turbine type.

The invention, in its preferred embodiment, is directed to a control for an aircraft power plant of the type in which a propeller is driven by a gas turbine engine.

The performance requirements for modern aircraft power plants are such, and the operating characteristics of gas turbine engines are such, that the provision of satisfactory control of the engines and propellers is difficult.

Normally, in take-off and in flight operation, the engine speed is controlled by the propeller governor, which acts by varying the propeller pitch, and the engine power output is controlled by a pilot operated power control lever which controls a fuel throttle for the engine. However, when the plane is landing, the engine power output must be reduced to substantially zero or slightly less than zero, and the propeller pitch is ordinarily at a minimum value in the governing range determined by a pitch stop. As the plane lands and its speed decreases, the power furnished to the system by the wind-milling propeller decreases, with the result that engine speed tends to decrease to an undesirably low value.

Also, in ground operation, the propeller may be operated at fixed pitch settings which may vary through a range of positive values, or through a range of positive and negative values if reverse thrust is desired for braking or for maneuvering multi-engined craft. When the blade angle is fixed, the propeller governor is inoperative to control engine speed and, therefore, some means must be provided to control engine speed and power in accordance with the pitch setting of the propeller.

It has been proposed to accomplish these functions by providing a fuel system for the engine including an overspeed governor which may be set to various governing speed values and coordinating the settings of the overspeed governor and the primary power control or engine throttle. The characteristics of the engine may be coordinated with the propeller power demand to reasonable satisfaction when the power plant is operating at fixed blade angle or in what may be called the taxiing regime of control. With a system of this sort, when the power plant is operating in propeller governing control, the engine over-speed governor is adjusted to a speed value above that of the propeller governor.

The overspeed governor, however, by its nature is not adapted to prevent the speed of the engine from falling below what is desired. Thus, the primary fuel control must be relied upon to provide sufficient fuel to maintain engine speed under the load conditions involved. However, if the load varies, as for example with variations in air speed during landing, this condition is not counteracted by the primary power control.

The type of control employing the variable overspeed governor, therefore, is unsatisfactory under certain conditions even with a single power plant in the aircraft. In aircraft which have multiple propellers, such a control system may give rise to undesirable unbalance between the thrusts of the port and starboard engines.

Another defect of the overspeed governor control arises from the fact that the aircraft power plant usually drives auxiliaries for aircraft service, such as generators. If the engine speed falls too low, an alternator, for example, driven by the engine may cut out because of the underspeed condition, thereby disabling the electric power supply to the aircraft.

The present invention, in its preferred embodiment, incorporates many elements of known fuel systems which have proved satisfactory. It differs principally from the system discussed above in that it employs an underspeed governor, the setting of which is preferably varied coordinately with the setting of the primary power control. By virtue of this system, the engine speed is held above a curve based on the governor characteristic which may be quite steep, so that, in effect, the engine is held to a substantially constant minimum speed regardless of changes in windmilling power input from the propeller, variations in the engine, and discrepancies in characteristics of other elements of the engine fuel controls.

The principal objects of the invention are to provide improved control for turboprop power plants, to provide a control particularly suited to assure proper power and speed regulation of the engines under landing and other fixed blade angle conditions, and to provide a control which provides a lower limit of engine speed to assure proper functioning of engine driven auxiliaries.

The manner in which these and subsidiary objects of the invention are preferably achieved will be clear to those skilled in the art from the succeeding description of the preferred embodiment of the invention.

Referring to the drawings: FIG. 1 is a schematic diagram of a turboprop aircraft power plant and fuel control system therefor, FIG. 2 is a chart illustrating the functioning of the power plant under landing conditions, and FIGURE 3 is a schematic showing of a propeller.

Referring to FIG. 1, this system includes a gas turbine engine A which may be of any known type, the details of which are immaterial to the invention. The engine may, as is customary, comprise a compressor discharging into a combustion section which discharges motive fluid into a turbine which drives the compressor. The engine is coupled through reduction gearing B, shown schemmatically, to a propeller C which may be of any suitable type, but preferably is of a known type, which is capable of operation either in blade angle control at various pitch settings or in governor control in which the propeller pitch is regulated by a speed-responsive governor. Power plants of this type are illustrated generally in U.S. Patent 2,851,113 and 2,860,712, both resulting from applications filed prior to the filing date of our application Serial No. 280,466. These patents show two gas turbine engines connected to a propeller, but obviously one engine may be omitted from these dual engine power plants.

In addition to the propeller C, the engine drives a generator D which supplies power to the aircraft. The power output shaft 11 drives an auxiliarry shaft 12 through gearing 13, this shaft 12 driving the generator D.

The auxiliary shaft 12 also drives, through gearing 14 and shaft 16, a fuel pump 17, which furnishes fuel to the combustion chambers of the engine. Fuel is supplied from a suitable source in the aircraft through line 18 to the pump 17, which discharges it through a line 19 to a primary power control or engine throttle valve 21. From the throttle valve the fuel proceeds through a conduit 22, an overspeed governor valve 23, and a conduit 24 to the combustion section of the engine. The overspeed governor valve is normally open, but is provided as a safety feature to limit engine speed to the maximum safe value. A variable underspeed governor valve 26 is connected between the pump discharge line 19 and the engine, in parallel with the valves 21 and 23, by conduits 27 and 28. This valve thus provides an additional path for flow of fuel from the pump to the engine, which is normally closed but which opens to supply additional fuel when the engine speed decreases to a value near the governor setting.

Both the governor valves 23 and 26 are responsive to engine speed and the governor valve 26 is additionally responsive to a speed signal input from the pilot's power plant control lever 30, which also controls the throttle valve 21.

In order to obtain constant performance of the valves 21, 23 and 26 irrespective of variations in pump output pressure and engine input pressure (which varies with pressure in the combustion chamber and with variations in flow through the fuel nozzles), a bypass valve 32 is provided. This valve bleeds fuel from the pump discharge line 19 and returns it to the pump inlet line 18 through a by-pass conduit 33. The by-pass valve is provided with a pressure connection through line 34 to the engine inlet or, in other words, the downstream side of the several control valves, and acts to maintain the pressure difference between the line 19 and the line 24 substantially constant, so that the flow through the system is directly determined by the throttle apertures of the valves and is thus independent of pump displacement and engine inlet pressure.

From this general discussion of the fuel control installation, we may continue to a more detailed description. It is to be understood that the valves are shown in simplified diagrammatic fashion without inclusion of immaterial constructional details of the valves, that the physical structure of the valves may vary greatly, and that the valves shown may be combined into composite valves, if desired. The present showing is sufficient for an understanding of the principles of the invention, and it is unnecessary to burden the description of the invention with details of valve structure.

It should also be understood that actual fuel systems for aircraft gas turbine systems should incorporate provisions for varying the fuel flow in accordance with ambient conditions and, preferably, include a valve responsive to combustion temperatures in the engine in one way or another to limit fuel flow in the event the engine temperature becomes excessive. It will be understood that such additional controls may simply involve additional throttling or by-pass valves or may act to vary the pressure across the main throttling valves in the system in accordance with ambient conditions. Since these features of fuel systems are well understood by those skilled in the art and need not be described in order to explain the present invention, they are not included.

The primary control valve 21 is illustrated as comprising a cylindrical casing 35 within which is mounted a sliding piston or plunger 34' actuated by a stem 36. The plunger 34' moves to restrict to a varying degree the inlet port 37 of the valve. A bleed passage 38 through the plunger prevents trapping of fluid. The valve 21 is controlled by the pilot's power control lever 30 through mechanism illustrated schematically by the shaft 39 and cam 40, the cam providing the desired coordination or scheduling of power with respect to position of the lever 30.

The overspeed governor valve 23 may be of similar structure to the primary control valve, comprising a plunger 41 slidable in the cylinder 42 to obstruct the inlet and outlet ports of the valve. The stem 43 of this valve is controlled by a speed-responsive device indicated schematically by a conventional flyball governor 44 driven from the auxiliary shaft by gearing 46. Speed-responsive device 44 and valve 23 constitute an overspeed governor. The speed-responsive device 44 is also coupled to the underspeed governor valve 26 by an extension 47 of the stem 43, which reciprocates the piston 48 of the underspeed valve. The piston 48 is slidably mounted within a sleeve 49 which in turn is slidably mounted within the generally cylindrical casing 51 of the valve 26. Sleeve 49 is coupled by stem 52 to a cam 53 on the shaft 39 operated by the power control lever 30. The line 27 from the pump 17 delivers fluid through an axially elongated port 54 in the valve casing 51 and fluid is discharged into the line 28 from a similar elongated port 56. Ports 57 and 58 in the sleeve 49 register with the ports 54 and 56, respectively, over the range of travel of the sleeve 49. The piston 48 acts to close or variably throttle the ports 57 and 58 in response to the relative axial movement of the piston 48 and sleeve 49. Thus, the amount of opening of the valve 26 is a function of engine speed, which determines the position of piston 48 by the action of the speed-responsive device 44, and the position of the sleeve 49, which is set by the pilot through the cam 53. The setting of the underspeed governor valve is coordinated with that of the primary control valve for any given position of the power control lever by the cams 40 and 53.

Speed-responsive device 44 and valve 26 constitute an underspeed governor.

As is well understood by those well skilled in the art, the pitch and speed settings of the propeller are also controlled by the power control lever 30 through mechanism immaterial to the present invention, so that the propeller setting is also coordinated with the settings of the fuel control.

The by-pass control valve 32 may comprise a plunger 61 slidable in a cylinder 62 and urged upwardly by compression spring 63. The spring 63 thus tends to move the plunger into a position in which it closes the outlet from the valve 32 into the by-pass return line 33. Pump outlet pressure is exerted on the upper face of the plunger 61 through the line 19, and engine inlet pressure is exerted on the downward face of the plunger through the pressure connection 34. As will be apparent, the difference betwene these pressures will equal the force exerted by the spring 63 divided by the area of the piston. Thus, the valve 32 tends to keep the pressure drop across the controlling valves 21 and 23 in series and 26 constant, the spring 63 yielding to open the by-pass whenever the pressure differential increases above the desired value and moving the plunger to throttle the by-pass if the pressure differential decreases.

It is believed that the operation of the fuel system will be clear to those skilled in the art from the foregoing, but it may be outlined briefly. The capacity of the pump 17 is sufficient to supply fuel greater than the engine requirement at all times. The excess discharge is returned to the pump inlet through the valve 32, which maintains a constant pressure drop across the valves 21 and 23 in series and across the valve 26. Normally, the overspeed valve 23 is open and thus the fuel flow to the engine is determined by the size of the orifice in the primary control valve 21, which is adjusted by the pilot to obtain the desired power setting. Under flight conditions the valve 26 is also closed, the engine speed being determined by the propeller governor and engine power by the valve 21. If the propeller governor is not in action or if it should fail the engine is additionally protected by the overspeed governor 23 which begins to close as the engine approaches the maximum safe speed and thus throttles the fuel supply to the engine to reduce the speed. The valve 23 is capable of holding the engine to a safe speed even though there is no load and the valve 21 is wide open.

Under normal flight conditions the setting of the underspeed governor valve 26 is maintained sufficiently below that of the propeller governor that no fuel flows through this valve. However, under fixed blade angle conditions the setting of the underspeed governor valve is adjusted by the pilot's power control lever so as to maintain the engine minimum speed at that value which is appropriate for the particular value of blade angle selected by the pilot. Under these conditions, the valve 26 ordinarily opens to some extent to supply fuel to the engine in addition to that supplied through the valve 21. In fact, it is preferable that the underspeed governor valve 26 supply fuel during fixed blade angle operation, since this valve is speed-responsive and will act to maintain the engine speed substantially constant. The primary control valve 21 may control speed indirectly through the relation of fuel feed to the load on the engine but is obviously not capable of regulating engine speed as accurately as the valve 26. The more accurate regulation of engine speed is particularly desirable to obtain balance of thrust in multiple engine installations. In such installations, if the several underspeed governor valves 26 are accurately balanced, all propellers will turn substantially at the same speed regardless of minor variations in the engine characteristics and other factors affecting engine speed.

FIGURE 3 is a schematic showing of conventional propeller structure including governor-controlled pitch varying means and a low pitch stop. The hug 70 of propeller C mounts blades 71. The hub 72 of each blade (one being shown) is coupled for rotation about its axis by a hydraulic motor 73, the piston 74 of the motor being coupled to an arm 76 on the hub. The motor is controlled by a valve 77 to which oil under pressure is supplied by a pump (not shown) through line 78. The spool 79 of the valve is coupled to a suitable speed-responsive governor schematically represented at 81 rotating with the propeller. The governor controls valve 77 and thus motor 73 to increase pitch when propeller speed is above the setting of the governor and to decrease pitch when the speed is below the setting.

A low pitch stop is operative when the propeller is under control by the governor. The stop device 82 includes a retractable stop 83 engageable with a lug 84 on the blade hub. The blade is shown in the minimum governed pitch.

The minimum governed pitch is the pitch at which the propeller pitch is limited by the low pitch stop.

In landing operation, the underspeed governor is particularly helpful. When the plane is landing, it is desirable to keep the propeller in the speed governing mode of operation so that the plane is in condition to continue flight if the landing is aborted. Under such conditions, the engine is operating at substantially zero power so that there is little or no forward thrust and, generally, a slight negative thrust—in other words, the propeller is absorbing energy from the air stream. Because of the low engine power, the propeller will operate below the governor speed setting. The propeller will thus be brought to the minimum pitch value of the pitch range available in governing control, that is, it will engage the low pitch stop, so that the propeller governor is effectively out of operation, and the propeller is essentially in a fixed blade angle condition. If the plane makes the landing and is braked to a stop, the relative wind will decrease from, say, 100 miles per hour to zero, with the result that the propeller requires considerable power. The characteristics of the gas turbine engine are such that to generate this power at a fixed throttle setting the engine speed will fall off very considerably.

These conditions are illustrated in the diagram of FIG. 2, in which the abscissa is engine revolution per minute and the ordinates represent power section horsepower and propeller brake horsepower. The vertical line G—G represents a speed of some 14,300 revolutions per minute, which is assumed to be at or below the engine speed for which the propeller governor is set. The line P—P represents the brake horsepower required by the propeller at 100 miles per hour wind speed and minimum blade angle. As will be seen, this value is negative, indicating that the propeller is furnishing energy to the power section in an amount varying from, roughly, 80 horsepower at 14,300 r.p.m. to about 200 horsepower at 12,000 r.p.m. The curve P'—P' represents propeller brake horsepower under static conditions; that is, with no apparent wind. It will be seen that the propeller requirement varies from approximately 500 horsepower at 12,000 r.p.m. to about 1,000 horsepower at the governor speed setting. The curve T—T represents the engine power output characteristic at a fixed throttle setting corresponding to zero engine shaft horsepower at 14,300 r.p.m. The difference of some 80 horsepower between the ordinates of the curves T—T and P—P at 14,300 r.p.m. represents power absorbed in the reduction gear, including the power required to drive auxiliaries such as the generator D. The curve U—U represents the engine power characteristic under control by the underspeed governor set to open at about 13,000 r.p.m. As will be seen, the fixed throttle engine characteristic curve T—T has a very slight slope, whereas the characteristic U—U is steep.

When the plane is landing with the engine throttle valve 21 set for zero shaft horsepower at 14,300 r.p.m., the system is in balance at 100 miles per hour. As the plane slows down on the runway or water, the apparent wind decreases and the power requirement of the propeller increases, the propeller characteristic moving from the line P—P toward the line P'—P'. Under the action of the primary fuel control 21, engine speed would decrease along the line T—T as the propeller power demand increased and would, presumably, stabilize when the plane came to a standstill at the point of intersection of the curves T—T and P'—P'. This, however, might be at an engine speed too low for stable operations; in other words, these two curves need not necessarily intersect. In any event, with typical engines and propellers, the point of intersection would be at an engine speed too low for proper operation of the generator D.

However, with the underspeed governor valve in the system, as soon as the propeller load brings the engine speed down to 13,000 r.p.m., the governor valve begins to open, supplying additional fuel to the engine so that it operates stably under static conditions at about 12,800 r.p.m., which is a sufficiently high speed to secure stable operation of the auxiliaries.

The curves of FIG. 2 also illustrate in a general way the operation of the underspeed governor in providing additional engine power and stabilizing engine speed in fixed blade angle operation for taxiing. The valve 21 may be set to cause the engine to operate on a characteristic curve similar to T—T but at a higher power level. The relation of the propeller power demand to the underspeed governor setting ordinarily would be such that the power plant operates on the underspeed governor characteristic rather than the primary control valve characteristic.

The invention, for simplicity of illustration, is shown as applied to a power plant in which a single power section drives a propeller, but is equally applicable to installation in which more than one power unit is geared to a single propeller, a known configuration. In such a configuration each power unit would have its own fuel system, but, the engines being geared together when operating concurrently, the engine governors would also be driven at the same speeds. In fact, the system is particularly desirable with aircraft power plants incorporating two power units clutched to a single propeller, since the fuel controls may be scheduled for normal operation of the propeller by both power units. If one power unit is cut out and declutched, the underspeed governor will automatically increase the fuel supply to the other power unit to the rate necessary to drive the propeller at the desired speed and thus provide from a single unit the power normally taken from two.

A further advantage of the invention lies in the fact that the underspeed governor is effective to hold the engine speed above the surge line in taxiing operation so that engine acceleration is facilitated.

The underspeed governor fuel control of the invention may be applied to power turbines used for other purposes than that described herein, and is also applicable to gas turbine jet engines. The characteristics of reciprocating internal combustion engines are such that in most cases no such control as this would be needed; however, the fuel system is adaptable to such engines if desired.

It will be apparent to those skilled in the art from the foregoing, that the fuel control system of the invention is particularly well suited to achieve the objects of the invention and to provide in a simple manner the most effective control of engine speed and power over a wide range and variety of operating conditions.

Although the preferred embodiment of the invention has been described in detail to explain the principles thereof, it is to be understood that many variations of the system may be made by the exercise of skill in the art within the scope of the invention.

We claim:

1. A fuel system for an engine comprising, in combination, fuel supply means, a fuel delivery conduit adapted to be connected to the engine to deliver fuel thereto, speed-responsive means adapted to be actuated by the engine, a fuel control valve adapted to be manually adjusted, ducting connecting the fuel control valve between the fuel supply means and the fuel delivery conduit, an underspeed fuel supply valve coupled to the speed-responsive means so as to be opened thereby upon decrease in speed of the engine beyond a datum value, and ducting connecting the underspeed fuel supply valve between the fuel supply means and the delivery conduit in parallel with the aforementioned ducting, the underspeed fuel supply valve and the last-mentioned ducting having sufficient capacity to supply a significant portion of the engine fuel requirement and thereby maintain the engine speed substantially at the datum value notwithstanding deficiency in the fuel supply from the fuel control valve.

2. A fuel system for an engine comprising, in combination, fuel supply means, a fuel delivery conduit adapted to be connected to the engine to deliver fuel thereto, speed-responsive means adapted to be actuated by the engine, a fuel control valve adapted to be manually adjusted, an overspeed valve coupled to the speed-responsive means so as to be closed thereby upon overspeed of the engine, ducting connecting the fuel control and overspeed valves in series relation between the fuel supply means and the fuel delivery conduit, an underspeed fuel supply valve coupled to the speed-responsive means so as to be opened thereby upon decrease in speed of the engine beyond a datum value, and ducting connecting the underspeed fuel supply valve between the fuel supply means and the delivery conduit in parallel with the aforementioned ducting, the underspeed fuel supply valve and the last-mentioned ducting having sufficient capacity to supply a significant portion of the engine fuel requirement and thereby maintain the engine speed substantially at the datum value notwithstanding deficiency in the fuel supply from the fuel control valve.

3. A fuel system adapted for supply of a gas turbine engine coupled to an external load, the system comprising, in combination, a fuel pump adapted to be driven by the engine, a fuel delivery conduit adapted to be connected to the engine to deliver fuel thereto, speed-responsive means adapted to be actuated by the engine, a fuel control valve adapted to be manually adjusted, an overspeed valve coupled to the speed-responsive means so as to be closed thereby upon overspeed of the engine, ducting connecting the fuel control and overspeed valves in series relation between the pump and the fuel delivery conduit, an underspeed fuel supply valve coupled to the speed-responsive means so as to be opened thereby upon decrease in speed of the engine beyond a datum value, means adapted to be manually adjusted for varying the said datum value of the underspeed fuel supply valve, ducting connecting the underspeed fuel supply valve between the pump and the delivery conduit in parallel with the aforementioned ducting, and means responsive to the pressure differential between the pump and the delivery conduit operative to maintain the said pressure differential substantially constant, the underspeed fuel supply valve and the last-mentioned ducting having sufficient capacity to supply a significant portion of the engine fuel requirement and thereby maintain the engine speed substantially at the datum value notwithstanding deficiency in the fuel supply from the fuel control valve.

4. A fuel system for a gas turbine engine comprising, in combination, fuel supply means, a fuel delivery conduit adapted to be connected to the engine, a variable fuel supply valve and an overspeed governor controlled fuel supply valve connected in series between the fuel supply means and the said delivery conduit, and a variable underspeed governor controlled fuel supply valve connected in parallel with the other two said valves between the fuel supply means and the said delivery conduit, the overspeed governor controlled valve being constructed to close as engine speed increases above a first predetermined value, and the underspeed governor controlled valve being constructed to open as engine speed decreases below a second predetermined value lower than the first predetermined value.

5. A fuel supply system for a gas turbine engine comprising, in combination, fuel supply means, a settable power control connected between the fuel supply means and the engine operable to supply regulated fuel from the supply means to the engine, means responsive to engine speed, fuel control means connected between the fuel supply and the engine in parallel with the power control, and means coupling the fuel control means to the speed responsive means operable to actuate the fuel control means to supply fuel to the engine in addition to that supplied by the power control when engine speed decreases below a predetermined value so as to maintain engine speed approximately at the said predetermined value.

6. A fuel supply system for a power plant comprising a gas turbine engine and a propeller driven thereby, the fuel supply system comprising, in combination, fuel supply means, a settable power control for regulating the fuel supply to the engine adapted to maintain fuel flow substantially independent of engine speed, a settable speed-responsive fuel control adapted to supply fuel to the engine additional to that supplied by the power control when engine speed decreases to the speed setting thereof to maintain engine speed at the desired level notwithstanding variations of engine load and operating conditions, and an overspeed fuel control adapted to reduce the fuel supply to the engine when engine speed increases to the speed setting thereof.

7. A fuel supply system for an engine comprising, in combination, means for supplying fuel, first fuel control means connected between the supplying means and the engine adapted to regulate the rate of supply of fuel to the engine, engine speed responsive means connected to the first fuel control means operative in response to increase in engine speed above a predetermined maximum value to reduce the fuel supplied by the fuel control means and thereby limit maximum engine speed, and second fuel control means connected between the fuel supplying means and the engine actuated by the engine speed responsive means in response to decrease in engine speed below a predetermined minimum value to supply additional fuel to the engine to maintain engine speed approximately at the minimum value.

8. A fuel system for an engine comprising, in combination, fuel supply means, a fuel delivery conduit adapted to be connected to the engine to deliver fuel thereto, speed-responsive means adapted to be actuated by the engine, and fuel control valve means connected between the fuel supply means and the fuel delivery conduit adapted to regulate the flow of fuel to the engine, the fuel control valve means including manually controllable means for varying fuel flow, overspeed control means operated by the speed-responsive means adapted to reduce fuel flow below that determined by the manually controllable means in response to engine speed increase above a predetermined upper limit, and underspeed control means operated by the speed-responsive means adapted to increase fuel flow above that determined by the manually controllable means in response to engine speed decrease below a predetermined lower limit.

9. A fuel system for an engine comprising, in combination, fuel supply means, a fuel delivery conduit adapted to be connected to the engine to deliver fuel thereto, speed-responsive means adapted to be actuated by the engine, and fuel control valve means connected between the fuel supply means and the fuel delivery conduit adapted to regulate the flow of fuel to the engine, the fuel control valve means including manually controllable valve means for varying fuel flow, overspeed control valve means operated by the speed-responsive means adapted to reduce fuel flow below that determined by the manually controllable means in response to engine speed increase above a predetermined upper limit, and underspeed control valve means operated by the speed-responsive means adapted to increase fuel flow above that determined by the manually controllable means in response to engine speed decrease below a predetermined lower limit, the manually controllable and overspeed control valve means being connected in series and the underspeed control valve means being connected in parallel to the other two valve means.

10. A control for a turbo-prop power plant, the power plant comprising a compressor, a combustion section and a turbine for driving the compressor, means for delivering fuel to said combustion section including flow regulating means, means for controlling said flow regulating means including a speed governor, in combination with a propeller driven by the power plant and having variable pitch blades, a low pitch stop for said blades, and a second speed governor operatively connected to said propeller for controlling the pitch of said blades, said second governor being effective to move said blades against said stop upon a predetermined speed being reached, said first mentioned governor having a lower setting than said second speed governor whereby said first mentioned governor controls the speed of the power plant and the propeller by varying fuel flow in a speed range below said predetermined speed while said blades are against said stop and ineffective to vary speed.

11. A control for a turbo-prop power plant, means for delivering fuel to said power plant including flow regulating means, means for controlling said flow regulating means including a speed governor, in combination with a propeller driven by the power plant and having variable pitch blades, a low pitch stop for said blades, and a second speed governor operatively connected to said propeller for controlling the pitch of said blades, said second governor being effective to move said blades against said stop upon a predetermined speed being reached, said first mentioned governor having a lower setting than said second speed governor whereby said first mentioned governor controls the speed of the power plant and the propeller by varying fuel flow in a speed range below said predetermined speed while said blades are against said stop and ineffective to vary speed.

12. A fuel system as recited in claim 1 in combination with means varying the said datum value at which the underspeed fuel supply valve is operated.

13. A fuel supply system for a power plant comprising a gas turbine engine and a propeller driven thereby, the fuel supply system comprising, in combination, fuel supply means, a settable power control connected between the fuel supply means and the engine operable to supply regulated fuel from the supply means to the engine, means responsive to engine speed, fuel control means connected between the fuel supply and the engine in parallel with the power control, and means coupling the fuel control means to the speed responsive means operable to actuate the fuel control means to supply fuel to the engine in addition to that supplied by the power control when engine speed decreases below a predetermined value so as to maintain engine speed approximately at the said predetermined value notwithstanding variations of engine load and operating conditions and in the setting of the power control.

14. A fuel supply system for an engine comprising, in combination, means for supplying fuel under pressure, a fuel delivery conduit adapted to be connected to the engine to deliver fuel thereto, a manually adjustable fuel control valve, a normally open overspeed fuel control valve, means responsive to engine speed coupled to the overspeed fuel control valve to close the valve in response to engine speed above a first predetermined value; the two said fuel control valves being connected in series between the fuel supplying means and the fuel delivery conduit; a normally closed underspeed fuel control valve, means responsive to engine speed coupled to the underspeed fuel control valve to open the valve in response to engine speed below a second predetermined value lower than the first predetermined value; the underspeed fuel control valve being connected between the fuel supplying means and the fuel delivery conduit in parallel with the two first-recited fuel control valves, and having sufficient fuel flow capacity to maintain engine speed substantially at the second predetermined value.

15. A fuel supply system for an engine comprising, in combination, means for supplying fuel under pressure, a fuel delivery conduit adapted to be connected to the engine to deliver fuel thereto, a manually adjustable fuel control valve, a normally open overspeed fuel control valve, means responsive to engine speed coupled to the overspeed fuel control valve to close the valve in response to engine speed above a first predetermined value; the two said fuel control valves being connected in series between the fuel supplying means and the fuel delivery conduit; a normally closed underspeed fuel control valve, the means responsive to engine speed being coupled to the underspeed fuel control valve to open the valve in response to engine speed below a second predetermined value lower than the first predetermined value; the underspeed fuel control valve being connected between the fuel supplying means and the fuel delivery conduit in parallel with the two first-recited fuel control valves, and having sufficient fuel flow capacity to maintain engine speed substantially at the second predetermined value.

References Cited in the file of this patent
UNITED STATES PATENTS
2,536,158    Chamberlin et al. _____ Jan. 2, 1951